United States Patent [19]

Sato

[11] Patent Number: 5,359,427

[45] Date of Patent: Oct. 25, 1994

[54] DEVICE FOR REPRODUCING A RECORDED STILL IMAGE WITH A GENERAL-PURPOSE COMPUTER

[75] Inventor: Yoshiaki Sato, Tokyo, Japan

[73] Assignee: Asahi Kogaku Kogyo Kabushiki Kaisha, Tokyo, Japan

[21] Appl. No.: 727,911

[22] Filed: Jul. 10, 1991

[30] Foreign Application Priority Data

Jul. 12, 1990 [JP] Japan ................................ 2-184776

[51] Int. Cl.$^5$ ............................................. H04N 5/781
[52] U.S. Cl. ...................... 358/335; 358/906; 358/909.1
[58] Field of Search ............... 358/335, 906, 342, 903, 358/311, 909, 11, 140; 360/14.1, 35.1; 364/518; 345/189, 190, 200; 395/116, 154; H04N 5/76, 5/781

[56] References Cited

U.S. PATENT DOCUMENTS

| | | | |
|---|---|---|---|
| 4,641,203 | 2/1987 | Miller | 358/335 |
| 4,698,770 | 10/1987 | Rattan et al. | 358/903 |
| 4,717,971 | 1/1988 | Sawyer | 358/342 |
| 4,796,099 | 1/1989 | Compton | 358/335 |
| 4,797,750 | 1/1989 | Karweit | 358/335 |
| 4,817,050 | 3/1989 | Komatsu et al. | 364/518 |
| 4,949,187 | 8/1990 | Cohen | 358/335 |
| 4,969,042 | 11/1990 | Houtman et al. | 358/903 |
| 4,982,291 | 1/1991 | Kurahashi et al. | 358/335 |
| 5,130,813 | 7/1992 | Oie et al. | 358/335 |

FOREIGN PATENT DOCUMENTS

| | | |
|---|---|---|
| 0051226 | 5/1982 | European Pat. Off. . |
| 0156923 | 10/1985 | European Pat. Off. . |
| 0202671 | 11/1986 | European Pat. Off. . |
| 3938180 | 11/1989 | Fed. Rep. of Germany . |
| 4016962 | 5/1990 | Fed. Rep. of Germany . |
| 9009717 | 2/1990 | PCT Int'l Appl. . |
| 1487507 | 10/1977 | United Kingdom . |

OTHER PUBLICATIONS

IBM "Einführung in DOS 4.0 in: Reihe Betreibssysteme", IBM Deutschland GmbH, 1988, Chapter 3, pp. 3-1 3-44.

Test Siemens PCD-2 "Ein AT-Kompatibler fürs Büro" DE-Journal Computer persönlich, No. 23/86, Oct. 29, 1986, pp. 16 to 18.

Software-Review: Microsoft Windows "Fensterlin gehen" DE Journal c't magazin für computer technik, No. 8, Aug. 1986 pp. 26 to 27.

Kaisert, P.: Fotos auf Floppies (Still-Video) in: Funkschau 25, 1988, pp. 40 to 42. 8, Aug. 1986 pp. 26 to 27.

Translation of the German Office Action dated Jun. 9, 1993.

United Kingdom Search Report.

*Patent Abstracts of Japan*, vol. 11, No. 283, JP-A-62,078769.

French Search Report and Annex.

Primary Examiner—Tommy P. Chin
Assistant Examiner—Huy Nguyen
Attorney, Agent, or Firm—Sandler Greenblum & Bernstein

[57] ABSTRACT

A reproducing device includes a ROM card, a file control data RAM, a control circuit, and a general purpose computer. The control circuit is a peripheral device of the computer, and the ROM card and the file control data RAM are connected to the control circuit. The ROM card stores a format by which the general purpose computer reads data. The file control data RAM stores file control data of the magnetic disk. Image data recorded in a magnetic disk is read by the control circuit and temporarily stored in the buffer RAM. File control data recorded in the magnetic disk is transferred and stored in the file control data RAM in accordance with the format stored in the ROM card, and the computer reads the file control data from the file control data RAM, and the image data from the magnetic disk, in accordance with that format.

15 Claims, 12 Drawing Sheets

Fig. 2

| Number of bytes per logic block | 512 |
|---|---|
| Number of logic blocks per cluster | 16 |
| Number of reserved logic blocks | 1 |
| Total number of FAT areas | 1 |
| Number of entries in directory | 64 |
| Number of logic blocks per medium | 38414 |
| Indentification value of medium | FIH |
| Number of logic blocks per FAT | 9 |

Fig. 3a

| Logic Block Adress | | Name of Area | Area in Device |
|---|---|---|---|
| 0 | | Reservation Area (1 block) | File Control Data RAM |
| 1 9 | | FAT Area (9 blocks) | |
| 10 13 | | Directory Area (4 blocks) | |
| 14 ~ 29 | | 0002 | First Track |
| | | | |
| 766 ~ 781 | Cluster Number | 0049 | |
| 782 ~ 797 | | 0050 | Second Track |
| | | | |
| 1534 ~ 1549 | | 0097 | |
| | | | |
| 37646 ~ 37661 | | 2354 | Fiftieth Track |
| | | | |
| 38398 ~ 38413 | | 2401 | |

File Area

Fig. 3b

| | |
|---|---|
| 0000 – 0255 | R |
| 0256 – 0511 | G |
| 0512 – 0767 | B |

Fig. 4

| File Name ( 8 Byte ) | T Y P (3 Byte) | Attribute (1 Byte) | Reservation |
|---|---|---|---|
| Reservation | Date Made (2 Byte) | Time Made (2 Byte) | Cluster Number (2 Byte) | File Size (4 Byte) |

Fig. 5

| 000 | 001 | 002 | 003 | 004 | 005 | 006 | 007 | 008 |
|---|---|---|---|---|---|---|---|---|
|  |  | 003 | FFF |  |  |  |  |  |
| 009 | 010 | 011 | 012 | 013 | 014 | ... | ... | ... |
|  |  |  |  |  |  |  |  |  |

DEVICE FOR REPRODUCING A RECORDED STILL IMAGE WITH A GENERAL-PURPOSE COMPUTER

BACKGROUND OF THE INVENTION

1. Field of the Invention

The present invention relates to a device for reproducing images obtained by, for example, an electronic still camera, by using a general-purpose computer (hereafter, personal computer).

2. Description of the Related Art

The adoption of a magnetic disk as a recording medium for an electronic still camera is well known. Such a magnetic disk uses an analog recording signal which is frequency-modulated or DPSK-modulated (differential-phase-shift-keying-modulated) to be reproduced.

However, the data recorded on such a magnetic disk, (i.e., images, etc. to be reproduced by a personal computer) uses an analog recording format, which does not conform to the data reading format of the operating system (hereinafter called "OS") of the personal computer. Thus, the personal computer cannot read the images.

SUMMARY OF THE INVENTION

Therefore, an object of the present invention is to provide a device which enables an image obtained by, for example, an electronic still camera, to be reproduced using a personal computer.

According to the present invention, there is provided a device for reproducing a still image stored in a recording medium, by using a personal computer. The device comprises a file control data memory, file control data transferring means, and image data transferring means. The file control data memory stores file control data of a still image recording medium, according to the data reading format used by the operating system of the personal computer. The file control data transferring means transfers the file control data to the personal computer. The image data transferring means transfer image data recorded in the recording medium to the personal computer, in accordance with the file control data.

Further, according to the present invention, there is provided a device for transferring data stored in a recording medium to a personal computer. The transferring device comprises an operating system for controlling the personal computer, a temporary memory, a file control data memory, file control data transferring means, and digital data transferring means. The temporary memory stores digital data inputted from the recording medium. The file control data memory stores file control data of the recording medium, according to a data reading format used by the operating system of the personal computer. The file control data transferring means transfers the file control data stored in the file control data memory to the personal computer. The digital data transferring means transfers the digital data stored in the temporary memory to the personal computer, in accordance with the file control data.

BRIEF DESCRIPTION OF THE DRAWINGS

The present invention will be better understood from the description of the preferred embodiments of the invention set forth below, together with the accompanying drawings, in which:

FIG. 2 is a conceptual view of a parameter block to be installed in a device driver:

FIG. 3a is a conceptual view of an array of data in the still image reproducing device:

FIG. 3b is a conceptual view of the array of data in one file:

FIG. 4 is a view showing a format of a directory:

FIG. 5 is a view showing a format of the data in a FAT area;

DESCRIPTION OF THE PREFERRED EMBODIMENTS

Figure 1:
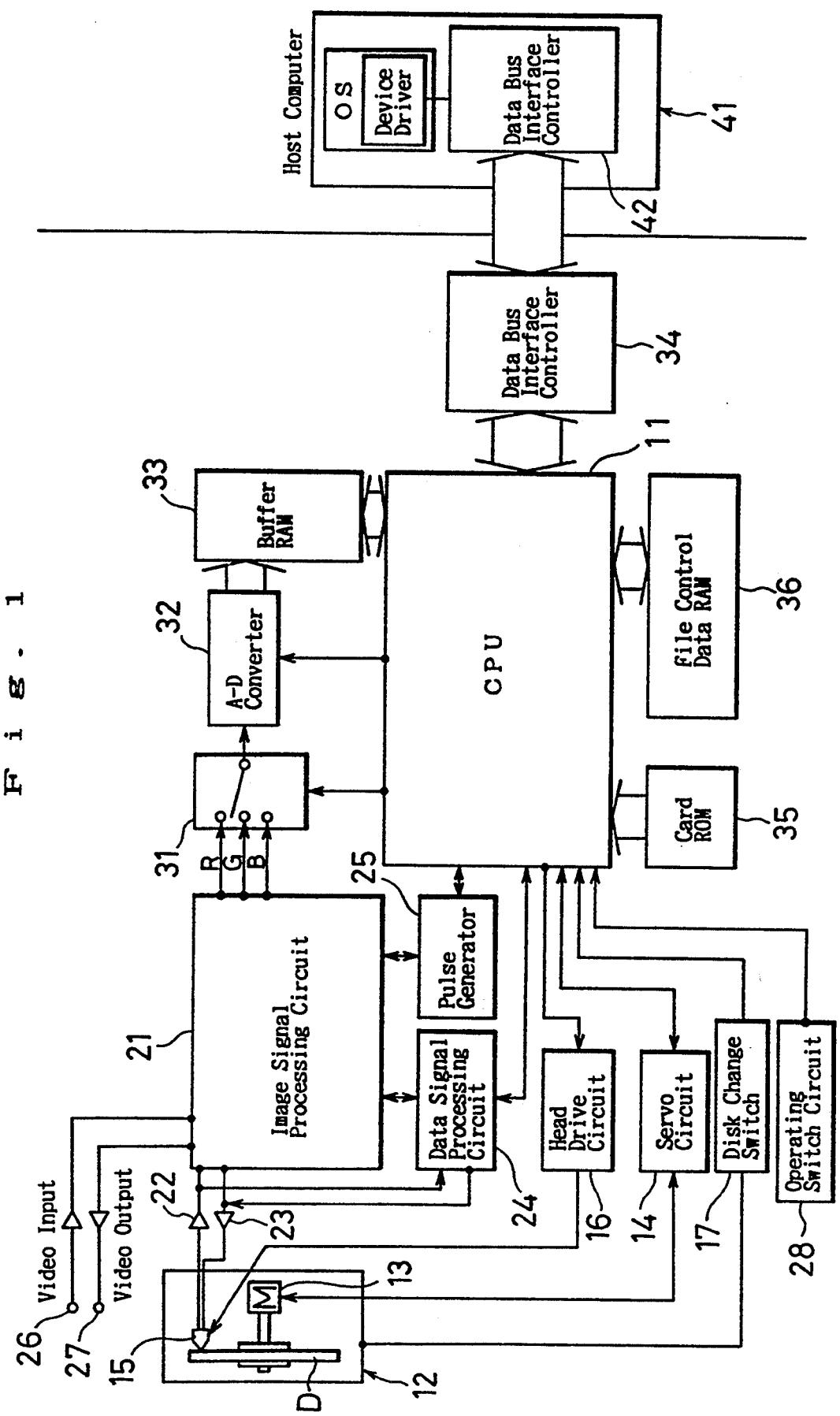
FIG. 1 is a block diagram showing a first embodiment of a still image reproducing device according to the present invention.

The present invention will now be described with reference to embodiments shown in the drawings.

FIG. 1 shows a still image reproducing device of a first embodiment of the present invention, wherein a control circuit (CPU) 11 is a conventionally known microcomputer which controls the entire still image reproducing device. A magnetic disk D is provided with fifty-two tracks, and images are recorded in the first through fiftieth tracks from an outer periphery of the magnetic disk D. The fifty-second track, which is the innermost track, is a cue track which can be used for recording a cue signal, etc. The fifty-first track is not used for recording.

In the disk device 12, the magnetic disk D is rotated by a spindle moter 13 that is driven and controlled by a servo circuit 14. A magnetic head 15 is mounted in such a manner that it is displaced radially over the magnetic disk D by a tracking motor (not shown) driven and controlled by a head drive circuit 16. The servo circuit 14 and the head drive circuit 16 are controlled by the control circuit 11. The disk device 12 is also provided with a disk change switch 17, for outputting a signal showing that the magnetic disk D has been changed. A signal outputted by this switch 17 is inputted to the control circuit 11.

An image signal processing circuit 21 is provided for frequency modulating image signals recorded on the magnetic disk D, and for reproducing those image signals. The image signal processing circuit 21 connected to the magnetic head 15 through amplifiers 22 and 23. A data signal processing unit 24 and a pulse generator 25 are connected to the image signal processing circuit 21, and are controlled by the control circuit 11. The data signal processing unit 24 is connected to the magnetic head 15 through the amplifiers 22 and 23, and reproduces data of a file name, etc. recorded on the cue track (i.e., the innermost track of the fifty-two tracks) of the magnetic disk D and reproduces data recorded, by a DPSK-modulation, in each of the recording tracks of the magnetic disk D. The pulse generator 25 generates clock signals from signals recorded on the magnetic disk D, and the clock signals are inputted through the image signal processing circuit 21 and is used for the analog-digital conversion of data and for storing the A-D converted data in a memory.

Note, that an operating switch circuit 28, connected to the control circuit 11, is provided for outputting commands, corresponding to an operation of various kinds of operating switches, to the control circuit 11.

The still image reproducing device is provided with a video input terminal 26 that is connected to an output terminal of a video player, etc. (not shown) and a video output terminal 27 that is connected to an input terminal of a display unit (CRT), etc. (not shown). The still image reproducing device is able to reproduce image signals inputted from the video player, thus enabling an image reproduced thereby to be displayed on a CRT.

Image signals are outputted to the video output terminal 27 as NTSC composite video signals, and are outputted to a selector 31 as R, G, and B signals. The selector 31 is controlled by the control circuit 11 to select one of these R, G, and B signals, one after another, and output the thus-selected signal to an A-D converter 32. An A-D converted signal outputted by the A-D converter 32 is temporarily stored in a buffer RAN 33, and inputted to a personal computer 41, i.e., a host computer, through the control circuit 11 and a data bus interface controller 34. In this embodiment, the buffer RAM 33 has a memory capacity corresponding to sixteen horizontal scanning lines.

The still image reproducing device is constructed in such a manner that image signals and file control data, such as a file name and a photographing date, recorded on the magnetic disk D, can be read by a personal computer 41. A ROM card 35 is connected to the control circuit 11, and thus, the OS of the personal computer 41 is provided with a format for reading the data to the control circuit 11. Further, a file control data RAM 36, for storing the file control data, is also connected to the control circuit 11. As to be described below, the personal computer 41 reads the file control data from the file control data RAM 36, and then reads image signals from the magnetic disk D on the basis of the file control data.

Note that data is recorded on the magnetic disk D in the field recording mode in an electronic still camera, whereby data corresponding to one image is recorded on one track, and in the case of the NTSC system, has 262.5 horizontal scanning lines.

The personal computer 41 is a well known general purpose computer, and a data bus interface controller 42 of the personal computer 41 and a data bus interface controller 34 of the still image reproducing device are connected to each other. The OS of the personal computer 41 controls the data bus interface controller 42, to thereby read the file control data from the file control data RAM 36, and thereafter reads the image signals from the magnetic disk D.

In this embodiment, the OS of the personal computer 41 comprises an MS-DOS (trademark of MicroSoft Corp.) system. In order to control peripheral devices, such as a still picture reproducing device, etc., using MS-DOS, a software program known as a "Device Driver" must be used with MS-DOS. The Device Driver includes a parameter block, as shown in FIG. 2, and MS-DOS recognizes a layout of the data in the still image reproducing device by referring to the parameter blocks.

The parameter block provided in the Device Driver, and the layout of data in the still image reproducing device, are described below with reference to FIGS. 2, 3a, and 3b.

An identification value of the still image reproducing device is defined as "F1H" in this embodiment. The total number of logic blocks in this device is "38414", i.e., the logic block addresses shown in FIG. 3a run from "0" to "38413".

A reservation area is an area which is not used for controlling the still image reproducing device. In this embodiment, the number of a logic block of the reservation area is "1", and the reservation area corresponds to the logic block address "0". An FAT area is an area showing which file (i.e., an image) is in which cluster. The total number of FAT areas is "1", and the number of logic blocks per FAT area is "9". Namely, the logic block addresses from "1" through "9" correspond to the FAT area. A directory area is provided for storing a file name (corresponding to a track number of a magnetic disk), etc. In this embodiment, the number of entries in the directory, i.e., the number of files which can be read from the magnetic disk, is "64". Since thirty-two bytes are needed per one directory, and the number of bytes per logic block is "512", it is possible to read sixteen (obtained by dividing 512 by 32) entries, i.e., files per logic block. Therefore, four blocks are needed to read sixty-four files, and thus, the logic block addresses "10" through "13" correspond to the shown directory area.

As described above, the reservation area, the FAT area and the directory area store the file control data, and these areas correspond to the file control data RAM 36 (FIG. 1). Namely, as described later, the personal computer 41 reads out the file name (the track number of the magnetic disk), etc. from the file control data RAM 36, not from the magnetic disk.

The file area corresponds to the logic block addresses "14" through "38413". The logic blocks are divided into clusters, and the number of logic blocks per cluster is "16". In MS-DOS, the cluster number starts from "0002", and therefore, for example, the logic block addresses "14" through "29" correspond to cluster number "0002". The file area stores image signals, and corresponds to the first track through the fiftieth track (in which image signals are recorded) of the magnetic disk.

FIG. 3b shows an array of the image signals in one file. The numerals indicated at the left side thereof show the relative logic block address, i.e., the relative addresses in the file. As can be understood from this drawing, the relative logic block addresses "0000" through "0255" store R-signals, the relative logic block addresses "0256" through "0511" store G-signals, and the relative logic block addresses "0512" through "0767" store B-signals, respectively. Note, one logic block corresponds to one horizontal scanning line.

FIG. 4 shows a format of a directory stored in the directory area (FIG. 3a). As shown in FIG. 4, the directory includes a file name area consisting of 8 bytes, and an area indicating the cluster number, consisting of 2 bytes. Further, other areas are included for storing the date at which a file is made (i.e., date of photographing), and the time at which a file is made (i.e., time of photographing), etc. Note that these areas are not necessary to the explanation of this embodiment, and thus a description thereof is omitted herein.

The file name corresponds to a predetermined track of the magnetic disk on which image signals are recorded. When reproducing a predetermined track of the magnetic disk, the OS of the personal computer 41 first reads the logic blocks of the directory area, to thereby find a directory including the corresponding file name, and then reads a cluster number in the directory. If the cluster number is "002", for example, the OS reads the area of the field number "002" of the FAT area (FIG. 3a), or if, for example, "003" is recorded in the area of the field number "002", as shown in FIG. 5, the OS then reads the field number "003". This operation is repeated until one reaches the field number in which "FFF" is recorded. A file to be reproduced exists in the cluster having the field number searched for, as shown above.

For example, when image signals recorded in the second track are to be reproduced, through a directory having a file name corresponding to the second track, it is recognized from the data of the FAT area that the data of the second track is stored in the areas denoted by the cluster numbers "0050" through "0097". These cluster numbers correspond to the logic block address "782" through "1549", as understood from FIG. 3a. Accordingly, when reproducing the image signals of the second track, the OS of the personal computer 41 outputs a command to transfer the data of the logic block addresses "782" through "1565" to the computer to the still image reproducing device. Namely, when reproducing the image signals of the magnetic disk, the personal computer 41 designates only the logic block addresses for the still image reproducing device.

Figure 6:
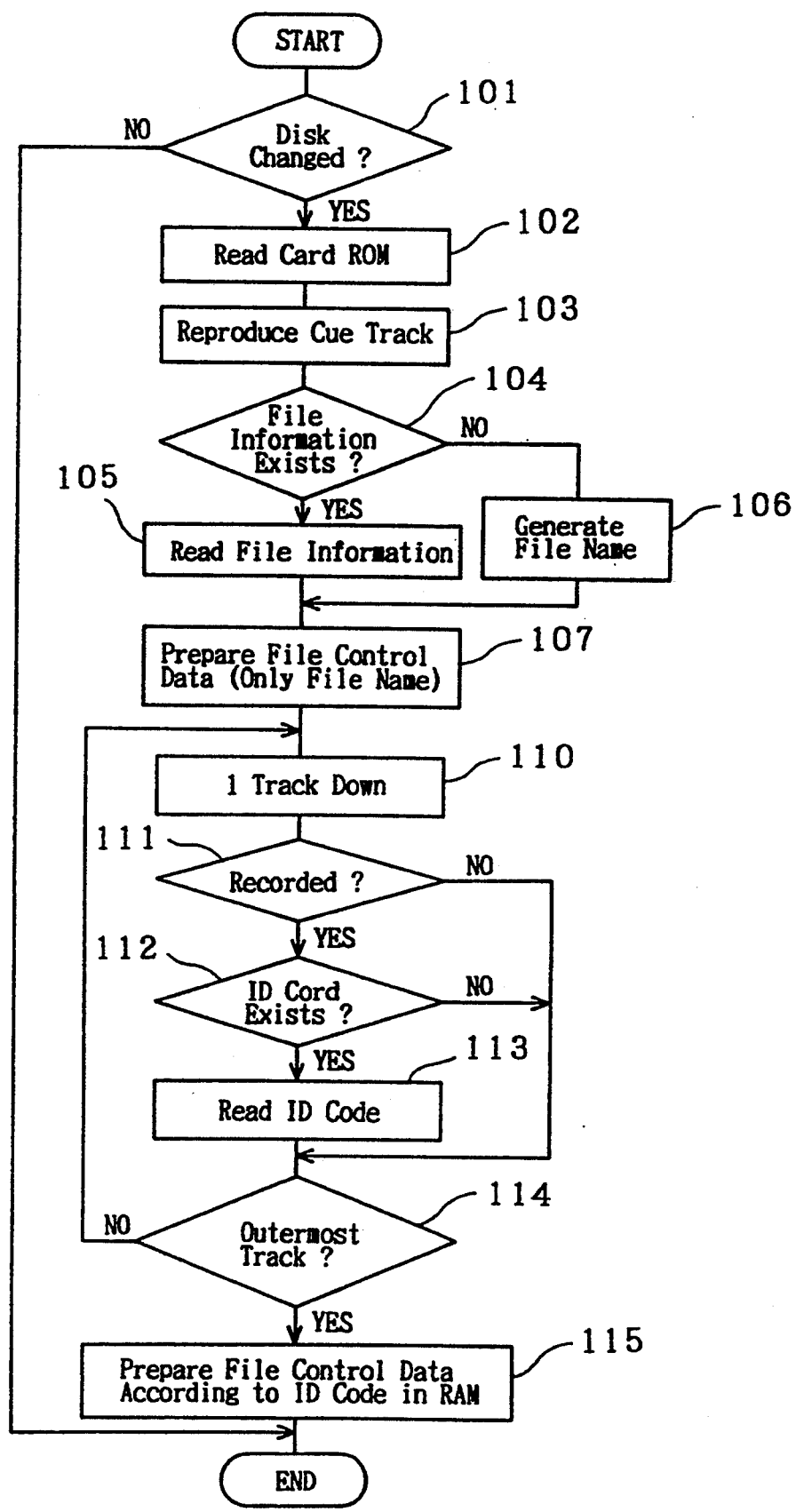
FIG. 6 is a flow chart of a program for producing file control data.

FIG. 6 shows a flow chart of a program for producing the file control data, the program being executed by the control circuit 11 of the still image reproducing device.

In Step 101, a signal is outputted from the disk change switch 17 (FIG. 1) and it is determined whether or not the magnetic disk D has been changed. When the magnetic disk has not been changed, the program ends without further processing. When a new magnetic disk has been mounted in the disk device 12, Steps 102 and the Steps following same are executed.

In Step 102, the card ROM 35 (FIG. 1) is read. A format which is used for a file control operation by the OS of the personal computer 41, i.e., information necessary for making the reservation, FAT and directory areas shown in FIG. 4, is stored in the card ROM 35.

In Step 103, the cue track is reproduced, and in Step 104 it is determined whether file information, i.e., a file name, has been recorded in the cue track. When file information has been recorded in the cue track, the file information is read out in Step 105. Conversely, when file information has not been recorded in the cue track, the file information is automatically generated in Step 106. This means, for example, that the file name in the first track is made "TR1", the file name in the second track is made "TR2", . . . The file name is generated in this manner so that the OS of the personal computer 41 can refer to a file name at all times, when reading out a file.

Then, in Step 107, the file control data is prepared and stored in the file control data RAM 36. Note that only the file name is generated as file control data in Step 107, and that the other file control data is generated in Step 115, as described later.

In Step 110, the magnetic head 15 (FIG. 1) is moved to a track located outward by one track from the track which has been read. In Step 111, it is determined whether or not this track has been recorded.

If this track has not been recorded, the process skips to Step 114, but if it has been recorded, then in Step 112 it is determined whether an ID code is recorded in this track. The ID code is DPSK- modulated and recorded on the magnetic disk, and comprises data concerning, for example, the date of photographing. When the ID code is not recorded, the process skips to step 114, but when the ID code is recorded, the ID code is read in Step 113. Accordingly, a presearch is executed in Steps 110 through 113, and the ID codes for all fifty tracks are stored in a RAM (not shown that is) connected to the control circuit 11.

In Step 114, it is determined whether or not the routine executed in Steps 110 to 113 has been completed up to the outermost track, and if not, the process returns to Step 110 and the abovedescribed process is executed for the next track. Conversely, if the above routine has been completed up to the outermost track, then in Step 115, file control data, such as, for example, the cluster numbers and the date the file was made, etc. are prepared according to the ID codes stored in the RAM for a presearch and the directory format stored in the card ROM 35, and then are stored in the file control data RAM 36 (FIG. 1).

Note that the cluster number is defined such that the data volume of the image signals per track is always forty-eight clusters.

As described above, tile file control data is written in the file control data RAM 36 (FIG. 1) in a format that can be read by the personal computer 41, and thus, the preparation for reproducing images on the magnetic disk, by the personal computer 41, is completed.

Figure 7:
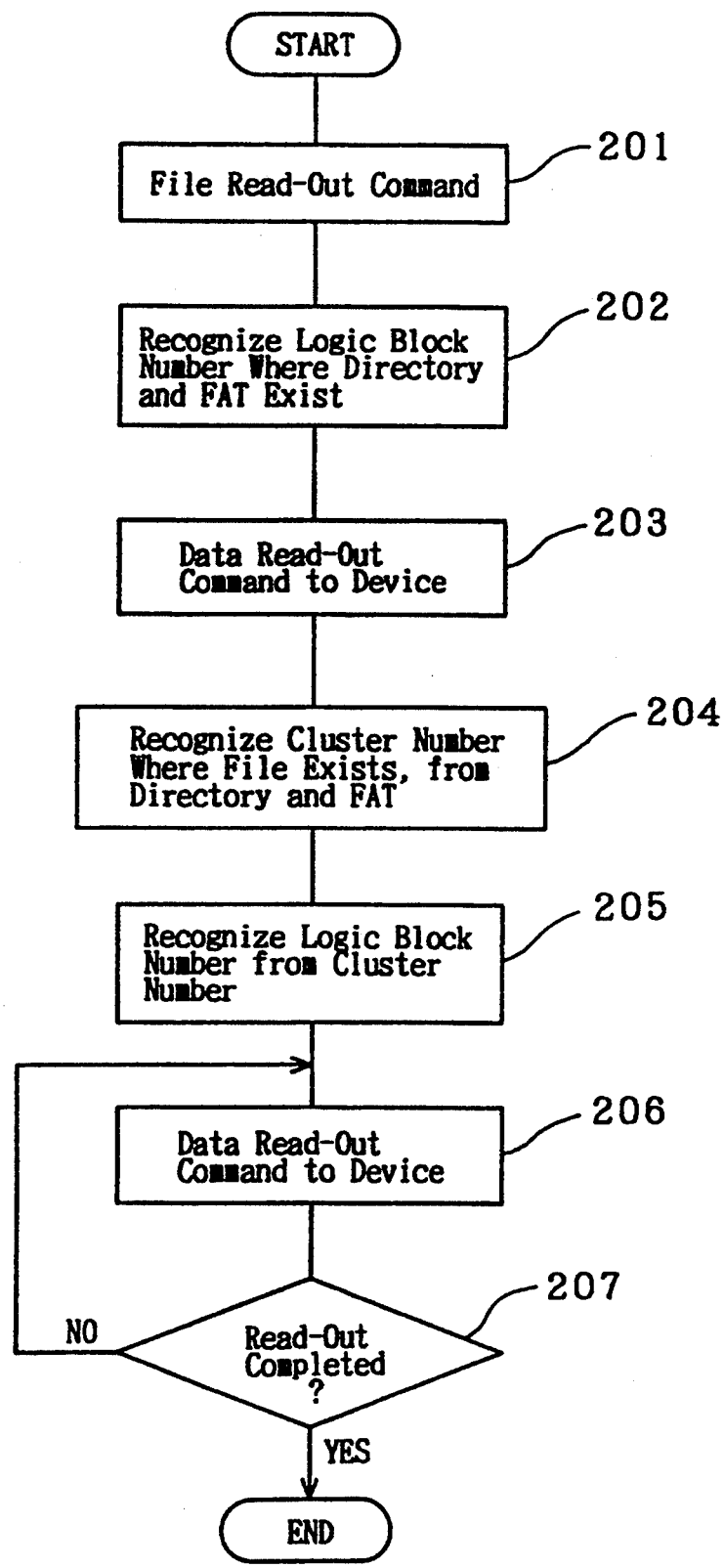
FIG. 7 is a flow chart of a program for reading a file by a personal computer.

FIG. 7 shows a flow chart of a program for reading a file by the personal computer 41.

In Step 201, when a user enters the file name to the OS of the personal computer 41, the file read-out command is executed. It is assumed during the ensuing description that, for example, a file name corresponding to the second track of the magnetic disk is entered. In Step 202, the parameter block shown in FIG. 2 is read with reference to the device driver in the OS, so that the logic block address in the FAT area and the directory area (FIG. 3a) are recognized. In this example, the logic block address "1" through "13" are the FAT areas and the directory area. In Step 203, the OS outputs a command to transfer the data of the logic block address "1" through "13" to the computer to the still image reproducing device. As a result, the still image reproducing device transfers the contents of the file control data RAM 36 to the OS of the personal computer 41 in accordance with a transfer program shown in FIGS. 8a and 8b, described later.

Accordingly, when the contents of the FAT area and the directory area are transferred to the OS, in Step 204 the OS recognizes the cluster number in which the image signals of the second track exist. In this example, the cluster number of the directory shown in FIG. 4 is "0050", and with reference to the FAT area (FIG. 3a), it is recognized that the image signals of the second track are recorded in cluster numbers "0050" through "0097". Then, in Step 205, the OS recognizes to which logic block each of the cluster numbers corresponds. This process is executed with reference to the file area (FIG. 3a). For example, the cluster number "0050"

corresponds to the logic block addresses "782" through "797", and the cluster number "0097" corresponds to the logic block addresses "1534" through "1549".

Figure 8A:
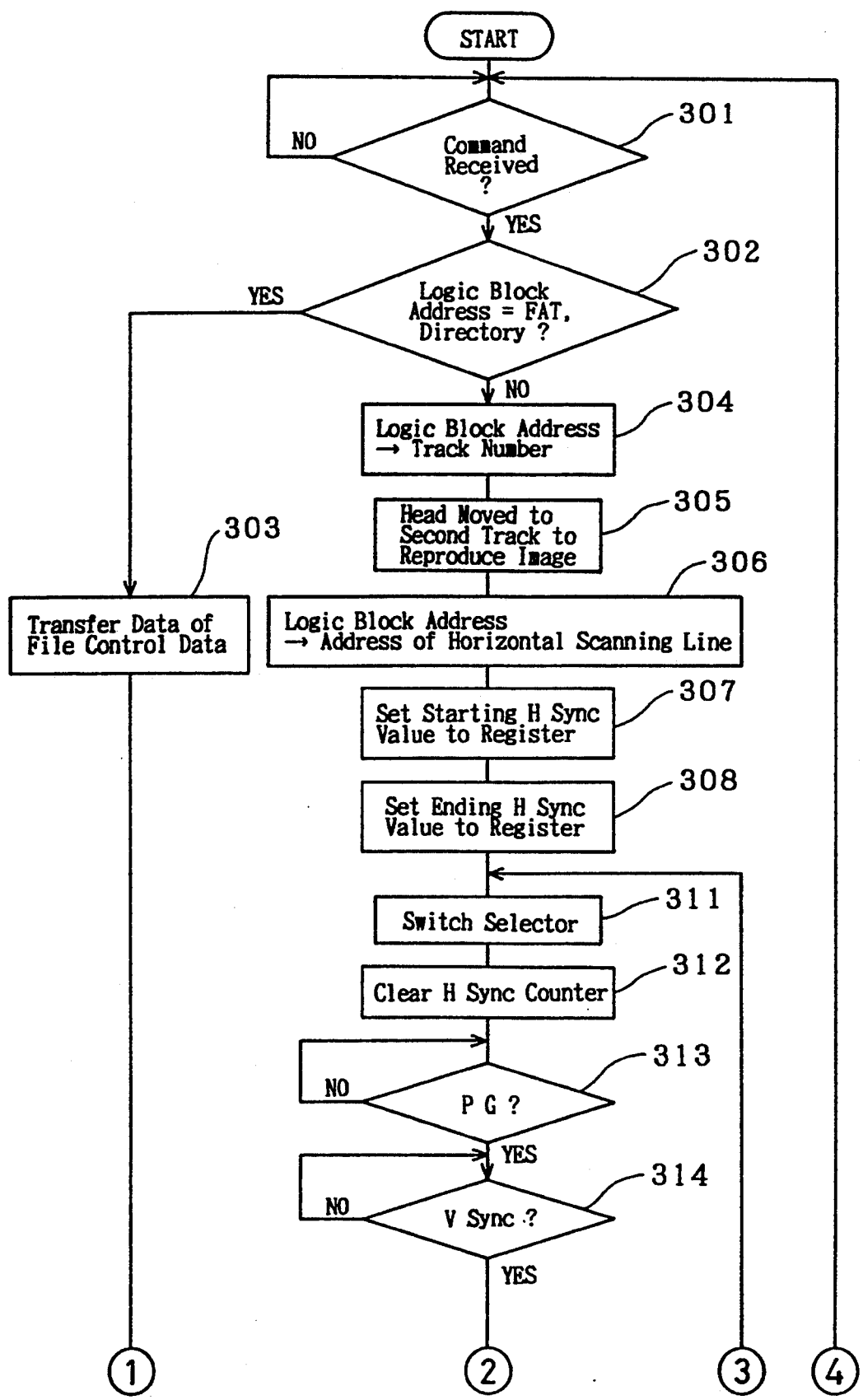
FIGS. 8a and 8b are flow charts of a program for transferring data to the personal computer.
Figure 8B:
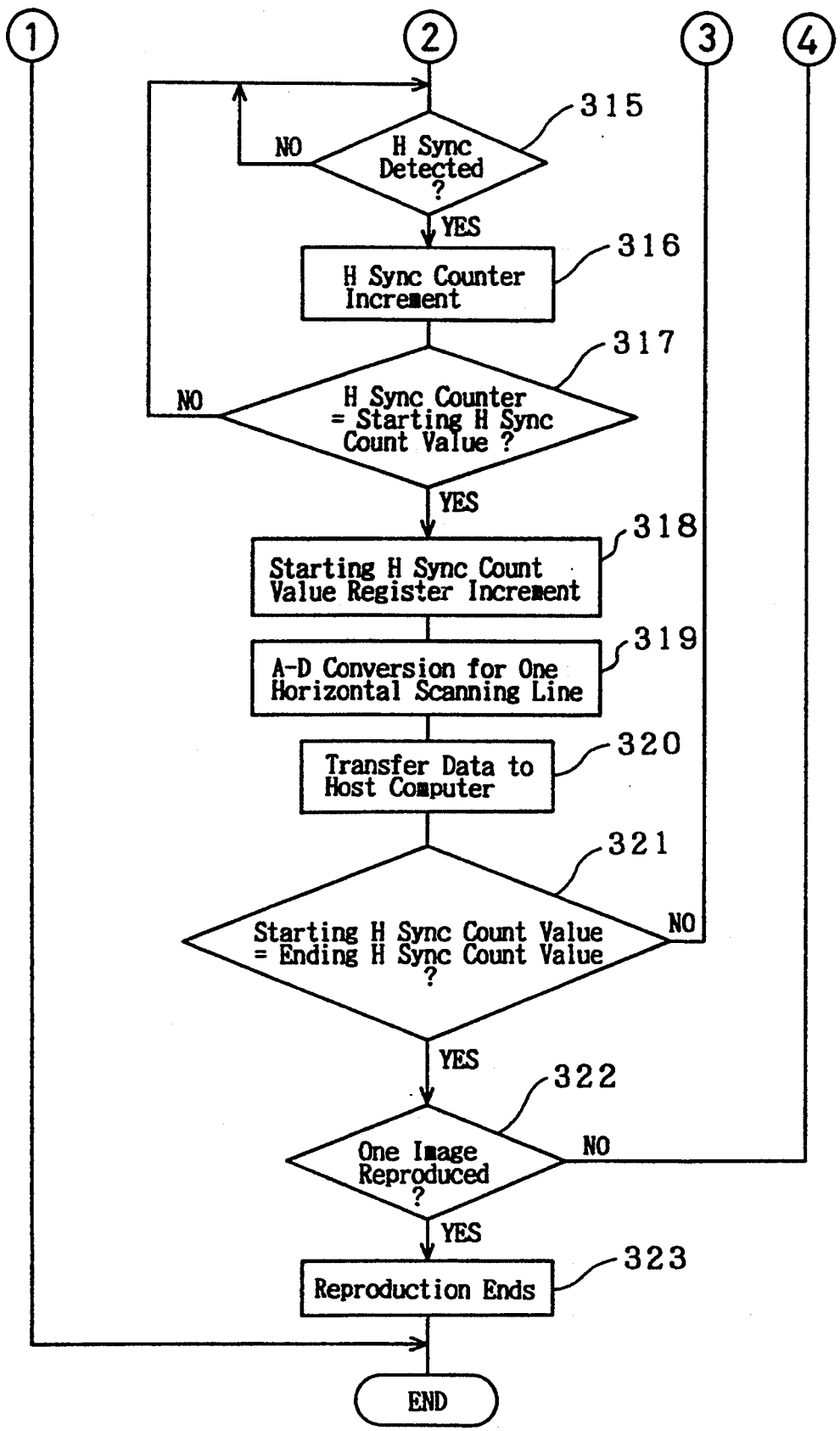

In Steps 206 and 207, the OS outputs a command to transfer the data of the logic block addresses "782" through "1549" to the computer to the still image reproducing device in accordance with the transfer program shown in FIG. 8a and 8b, as in Step 203. Nevertheless, the OS can read only the data of one cluster in a one-time data transfer, and in this example, the data of forty-eight clusters exist in one track. Therefore, in Step 206, the data of the logic block addresses "782" through "797" is transferred, and in Step 207 it is determined whether the reading of all of the logic blocks is finished. Namely, in Step 206 the data of the image signals is sent to the OS, one cluster by one cluster, and Step 206 is repeated until all of the data of forty-eight clusters is read out.

FIGS. 8a and 8b show a flow chart of the program for a data transfer, which is executed by the control circuit 11 (FIG. 1) of the still image reproducing device. This transfer program is processed by the control circuit 11 of the still image reproducing device in accordance with the data read-out command given in Steps 203 and 206 of the file read-out program shown in FIG. 7.

In Step 301, it is determined whether a read-out signal has been received from the OS of the personal computer 41. When the read-out command is received, the process goes to Step 302, and it is determined for which logic block the OS has commanded a read-out. When the program is executed in accordance with Step 203 in FIG. 7, i.e., when a read-out command is issued for the first logic block through the thirteenth logic block, which correspond to the FAT area and the directory area (FIGS. 3a and 3b), Step 303 is executed and data stored in the file control data RAM 36 of the still image reproducing device, i.e., the data in the FAT area and the directory area, are transferred to the OS of the personal computer 41, and thereafter, the program is ended.

Conversely, in Step 302, when it is determined that a read-out command for logic blocks other than those in the FAT and the directory area has been received, i.e., when this program is conducted in accordance with Step 206 in FIG. 7, the process goes to Step 304 and the address of the logic block designated in the read-out command is converted to the relevant track number. For example, when in Step 201 of FIG. 7, the user requests that the image of the second track be reproduced, in Step 205 of FIG. 7 the OS of the personal computer 41 recognizes that the second track corresponds to logic block addresses "782" through "1549", and in Step 206, the read-out command is outputted to these logic blocks, one cluster by one cluster, as described above. Namely, first the read-out command for the logic block addresses "782" through "797" is outputted. One logic block corresponds to one horizontal scanning line, one image (one track) has 256 logic blocks, and a lead logic block address of the file area to which image data is allocated is previously set. Therefore, in Step 304 of this program, by carrying out a calculation in accordance with these data, the logic block addresses are converted to the second relevant track number in accordance with a relationship shown in the Table of FIG. 3a.

In Step 305, the magnetic head 15 is moved to the second track and a reproduction of the image therein is started. In Step 306, in accordance with the Tables shown in FIGS. 3a and 3b, the logic block address now read out is converted to the address of horizontal scanning lines. For example, the 782nd logic block corresponds to an R-signal of the first horizontal scanning line of the image of the second track, and the 797th logic block corresponds to an R-signal of the sixteenth horizontal scanning line.

Figure 9:
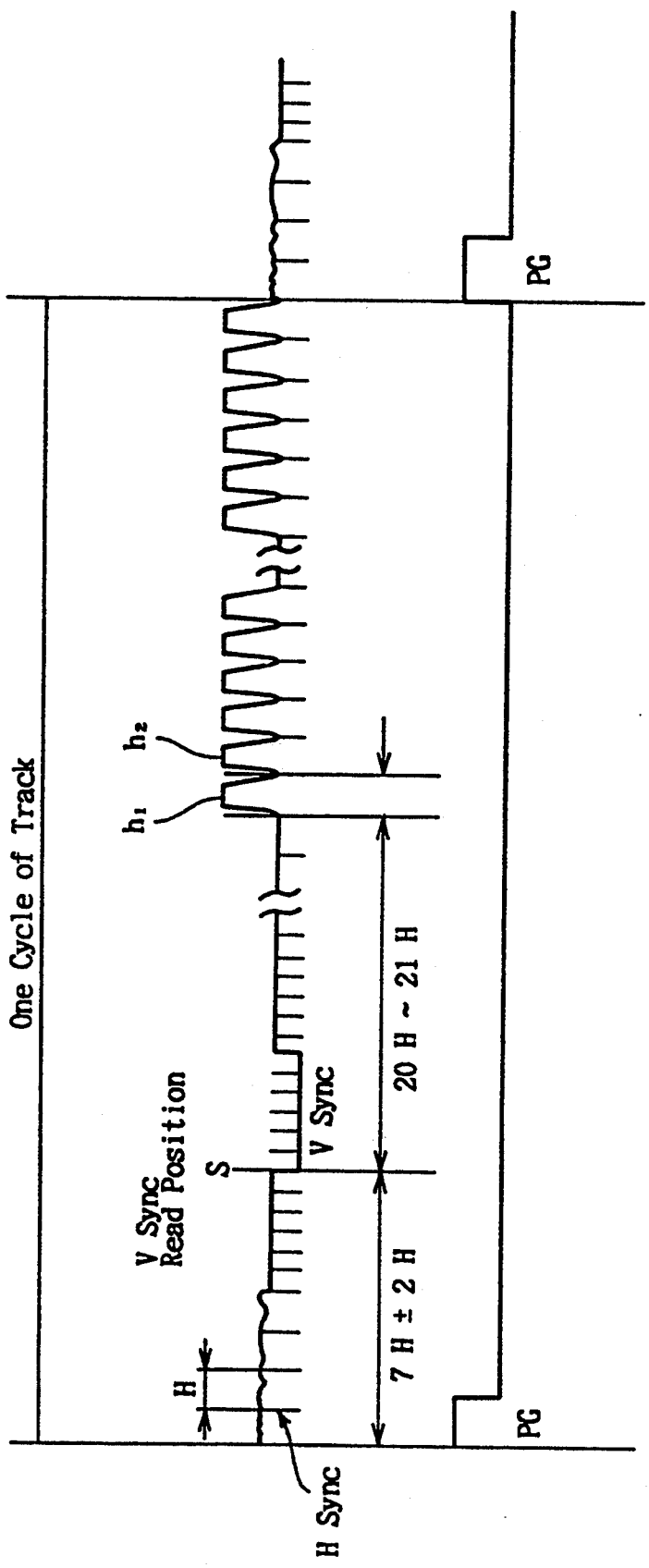
FIG. 9 is a diagram showing one example of signals recorded on a track of a magnetic disk.

The image signal recorded in the magnetic disk is now described, with reference to FIG. 9. The signal recorded in one track starts from a PG signal outputted at each revolution of the magnetic disk, and ends immediately before the next PG signal. In the signals recorded on this track, the horizontal synchronous signal "H sync" is recorded at each fixed horizontal scanning period "H", and a vertical synchronous signal "V sync" is recorded 7H±2H from the start of the PG signal, for example, a recording of horizontal scanning lines h1, h2, ... is started about 20H from the start of this vertical synchronous signal "V sync". The signal of each horizontal scanning line comes between two horizontal synchronous signals "H sync".

Returning to the flow chart of FIG. 8a, in Steps 307 and 308, the count value of the horizontal synchronous signal "H sync" corresponding to the horizontal scanning line obtained in Step 306 is set to a register of the control circuit 11. Namely, in Step 307, an H sync count value at which the horizontal scanning line about to be read out starts, is set. This starting H sync count value is the number of "H sync" signals occurring from the start of the vertical synchronous signal (shown with the reference "S" in FIG. 9) to the "H sync" immediately before the corresponding horizontal scanning line. When the read-out is carried out from an R-signal of the first horizontal scanning line, the starting H sync count value is defined to be 20+1=21H. Then, in Step 308, the H sync count value at which the horizontal scanning line about to be read out ends is set. Since sixteen horizontal scanning lines are read out for each execution of this program, the ending H sync count value is set to a value obtaibed by adding 16 to the starting H sync count value, namely the ending H sync count value is defined as 20+16=36H.

In Step 311, the selector 31 (FIG. 1) is switched. Namely, when the 782nd logic block through the 797th logic block are reproduced, the selector 31 is changed to the R-signal side. Then, in Step 312, the H sync counter is cleared to zero. In Step 313, it is determined whether the PG signal has been detected. When the PG signal is detected, the process goes to Step 314 and it is determined whether a start of the vertical synchronous signal V sync (shown with the references "S" in FIG. 9) has been detected. Then, in Step 315 (FIG. 8b) it is determined whether the horizontal synchronous signal "H sync" has been detected. When this signal is detected, the H sync counter is incremented in Step 316. Steps 315 through 317 are repeatedly executed until the value of the H sync counter reaches the starting H sync count value (for example, 21H) set in Step 307. When the value of the H sync counter reaches the starting H sync count value, the reading of the horizontal scanning lines (for example, reference "h1" shown in FIG. 9) to be reproduced can be effected.

Then, when Step 318 is executed for the first time, so that the register for the starting H sync count value is incremented, the value of this register becomes 22H, which is defined as the next starting H sync count value.

After that, the value of the register is incremented every time Step 318 is carried out.

In Step 319, the A-D conversion for one horizontal scanning line is carried out. The number of sampling times in the A-D conversion is 512 times per one horizontal scanning period and corresponds to the number of bytes "512" of one logic block. When the Step is carried out for the first time, this horizontal scanning line corresponds to the signal shown by reference "h1" in FIG. 9. The data obtained by carrying out the A-D conversion of this signal is temporarily stored in buffer RAM 33, and transferred to the host computer, i.e., the personal computer 41 through buffer RAM 33 in Step 320.

In Step 321, it is determined whether the starting H sync count value obtained in Step 318 has reached the ending H sync count value. If not, Steps 311 through 320 are again executed. Therefore, the data of the following horizontal scanning lines is A-D converted and the digital data transferred to the personal computer 41. As described above, the image signal is read out, one cluster by one cluster, and each one cluster includes the data of sixteen horizontal scanning lines. Therefore, Steps 311 through 320 are repeated sixteen times. Conversely, when it is determined in Step 321 that the starting H sync count value has reached the ending H sync count value, it is determined in Step 322 whether the data of one image (all of the R, G and B data per image) has been successfully transferred. If all of the data has not been transferred yet, the process returns to Step 301, and the above process is carried out again.

The above example is based upon a case wherein the image signals are transferred to the personal computer 41 for the logic block addresses "782" through "797". In this case, however, the image signals corresponding to the logic block addresses "798" through "813" are then transferred to the personal computer 41. Namely, the logic blocks are converted to the second track in Step 304, and in Step 305 the magnetic head 15 is held at the second track. In Step 306, the address of the logic blocks is converted to the address of the horizontal scanning line. For example, the 798th logic block corresponds to the R-signal of the seventeenth horizontal scanning line of the image of the second track. In Steps 307 and 308, the count value of the horizontal synchronous signal "H sync" and the ending H sync count value corresponding to the horizontal scanning line newly obtained in Step 306 (or by a renewal of the starting It sync count value in Step 318) is set in the register of the control circuit 11. When the horizontal scanning lines corresponding to the logic block addresses "798" through "813" are to be reproduced, the starting H sync count value is defined as 37H, and the ending H sync count value is defined as 52H.

Steps 311 through 321 are absolutely the same as those mentioned above, and are executed for sixteen horizontal scanning lines.

Thus, when the transfer is carried out sixteen times, for sixteen horizontal scanning lines, the data transfer of one image for the R-signals is ended. The data transfer is also carried out for both the G-signal and B-signal. Therefore, a loop consisting of Steps 301 through 322 will be carried out forty-eight times in total. Therefore, when it is determined in Step 322 that the data transfer of one image has ended, then in Step 323, processes such as a changeover, etc. of various kinds of switches are conducted to terminate the reproduction of an image, and the routine comes to an end.

As described above, in this embodiment, file control data, such as a file name and number of files, etc. which is recorded in a magnetic disk, are stored in the file control data RAM 36 (FIG. 1). The personal computer 41 can read the image signals of the magnetic disk mounted in the still image reproducing device, by deciphering the contents of the file control data RAM 36. Namely, in a usual disk device used as a peripheral memory device of a personal computer, file control data recorded on a magnetic disk is written on a magnetic disk. In the still image reproducing device of this embodiment, however, the file control data is not stored in the magnetic disk, but in the file control data RAM 36.

Further, in this embodiment, the magnetic disk is always rotated at a constant speed (for example, 60 revolutions per second) while the transfer of the image data into the personal computer 41 is being conducted. Thus, the magnetic head 15 detects the image signal cyclically (every one-sixtieth of a second), as shown in FIG. 9. The control circuit 11 detects the required data and A-D converts and transfers that data to the personal computer 41, in accordance with the program shown in FIGS. 8a and 8b, while the magnetic disk is rotated. Therefore, since the sampling of the image signals is carried out at each one revolution of the magnetic disk, the buffer RAM 33 (FIG. 1) does not need a capacity equivalent to one track, but needs only to have a capacity of sixteen horizontal scanning lines. Further, since the number of sampling times per one horizontal scanning line in the A-D conversion corresponds to the number of bytes of one logic block, image data of one horizontal scanning line is not deviated in a horizontal direction, whereby one picture data is exactly converted to digital data.

Still further, in this embodiment, a format by which the OS of the personal computer 41 reads the data is given to the control circuit 11 by the ROM card 35 (FIG. 1). Accordingly, the ROM card needs only to be prepared in accordance with the OS of the personal computer 41. Therefore, this embodiment can be adopted to various kinds of OS.

Figure 10:
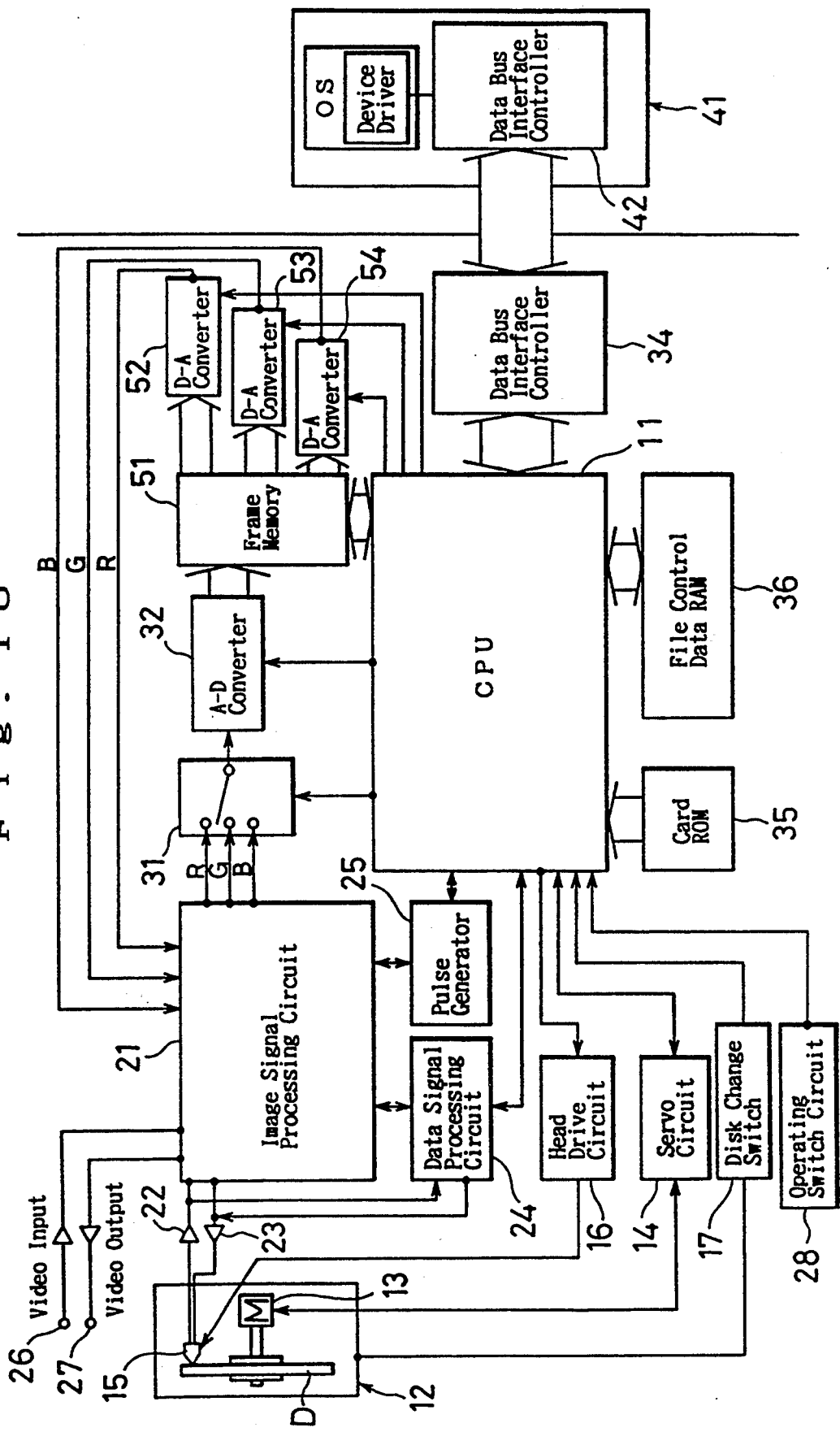
FIG. 10 is a block diagram showing a second embodiment of a still image reproducing device according to the present invention.

FIG. 10 shows a still image reproducing device according to a second embodiment of the present invention.

The points in which this embodiment differs from the first embodiment are described. In the second embodiment, a frame memory 51 is provided instead of the buffer RAM 33, and D-A converters 52, 53 and 54 are connected to this frame memory 51. The D-A converters 52, 53 and 54 are controlled by the control circuit 11, and output the D-A converted image data to the image signal processing circuit 21. The reproducing device of this embodiment can not only reproduce the image signals recorded on the magnetic disk D, by using the personal computer 41, but also can record image signals generated by the personal computer 41, on the magnetic disk D. The reproduction and recording process is started by the operating switch circuit 28. The construction of this embodiment, other than the above noted items, is the same as that of the first embodiment.

In the second embodiment, the parameter blocks provided in the device driver of the personal computer 41 and the layout of data in the still image reproducing device are the same as shown in FIGS. 2, 3a, and 3b, and are similar to the first embodiment. Further, a directory format stored in the directory area (FIG. 3a) and the format of the FAT area are the same as shown in FIGS. 4 and 5, and are similar to the first embodiment, respectively.

The personal computer 41 reads out a file in accordance with the flow chart of the program shown in FIG. 7, as in the first embodiment.

Figure 11:
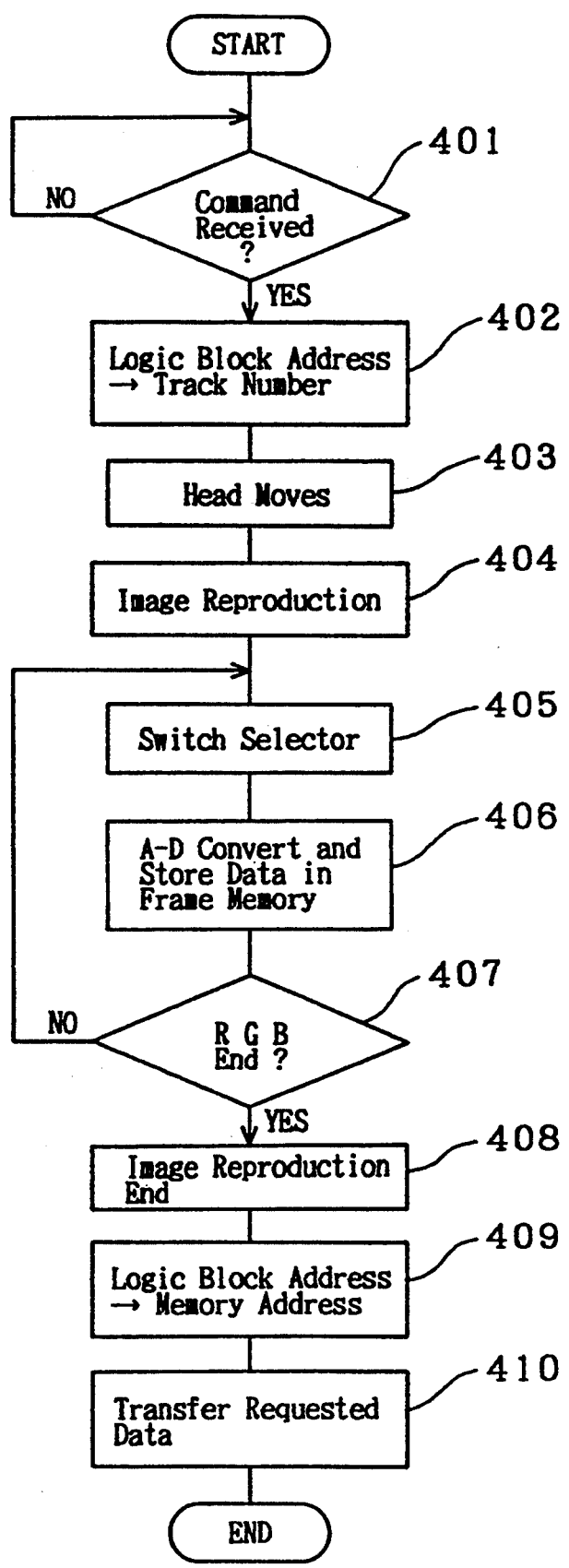
FIG. 11 is a flow chart of a program for transferring the data of a magnetic disk to a personal computer.

FIG. 11 shows a flow chart of a program for transferring image signals recorded on a magnetic disk to the personal computer 41. This program is executed by the control circuit 11 of the still image reproducing device. Although this program is executed in Steps 203 and 206 of the program shown in FIG. 7, as in the first embodiment, the Steps carried out for reading out the file control data (Step 203) are omitted, to simplify the description.

In Step 401, it is determined whether the read-out command has been received from the OS of the personal computer 41. When this read-out command is received, the process goes to Step 402, and the address of the logic block designated by the read-out command is converted to a track number. In Step 403, the magnetic head 15 is moved to the designated track, and then in Step 404, the image reproduction is started.

Then, in Step 405, the selector 31 (FIG. 10) is switched to the R-signal side, and in Step 406, the A-D conversion is carried out for this R-signal. At the same time, the A-D converted data is stored in the frame memory 51 (FIG. 10). Then, in Step 407, it is determined whether all of the R-signal, G-signal and B-signal have been successfully A-D converted and stored in the frame memory 51. If all have not been A-D converted and stored, Steps 405 and 406 are repeated for the G-signal and B-signal.

When this process is completed for the R, G and B-signals, various switches are turned OFF in Step 408. Thus, the image reproduction is ended. In Step 409, to enable the personal computer 41 to read the data stored in the frame memory, the addresses of the logic block of the data read in Step 406 are converted to the addresses of the frame memory 51, i.e., the addresses of the logic block are made to correspond to the addresses of the frame memory. For example, when the image signals of the second track are to be reproduced, the logic block numbers "782" through "1565" are made to correspond to the addresses "0000" through "0767" of the frame memory, as can be understood from FIGS. 3a and 3b. In Step 410, the data requested by the personal computer 41 is transferred from the frame memory 51 to the OS. Then, the routine ends.

Figure 12:
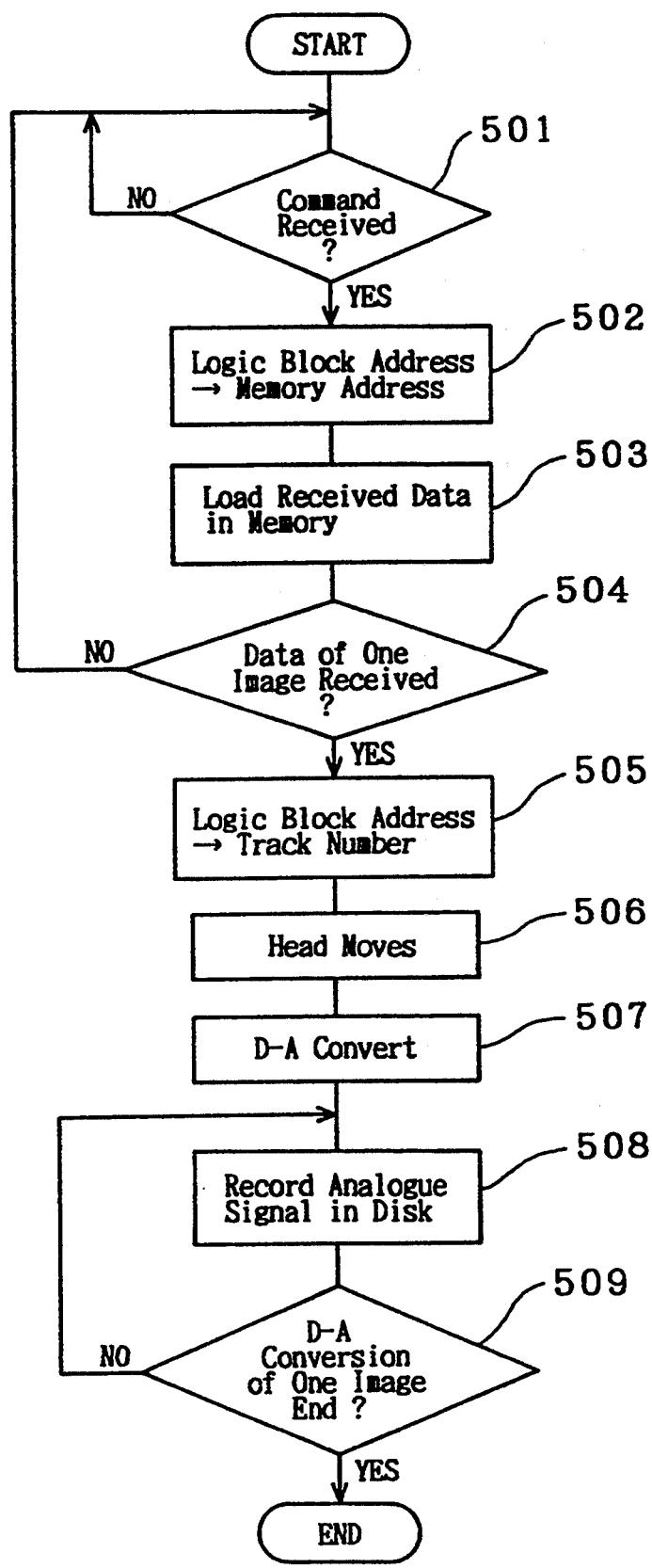
FIG. 12 is a flow chart of a program for writing data prepared by the personal computer to a magnetic disk.

FIG. 12 shows a flow chart of a program for recording the image signals prepared by the personal computer 41, on a magnetic disk. This program is executed by the control circuit 11 of the still image reproducing device.

In Step 501, it is determined whether a write command has been received from the OS of the personal computer 41. When the write command is received, an operation of the image signal processing circuit 21 is defined to be in a recording mode, as described later, and thereafter, the process goes to Step 502, in which addresses of a logic block designated by the write command are converted to the addresses of the frame memory 51, as in Step 409 of FIG. 11. In Step 503, the data received from the personal computer 41 is stored in the frame memory 51. In Step 504, it is determined whether the reception of data of one image has been completed. Similar to the first embodiment, when Step 503 is once executed, the data of sixteen logic blocks is stored in the frame memory 51, and as data of 768 logic blocks exists per image, when Steps 501 through 504 are repeatedly executed forty-eight times, the reception of the data of one image is terminated.

In Step 505, similar to Step 402 of FIG. 11, the addresses of the logic block designated by the write command are converted to the track number, and in Step 506 the magnetic head 15 is moved to a designated track. In Step 507, a D-A conversion of the data stored in the frame memory 51 is started, and in Step 508 analog R, G and B-signals obtained through the D-A conversion are recorded at the designated tracks of the magnetic disk D. Namely, in the recording mode, the analog R, G and B-signals are converted to a luminance signal "Y" and differential color signals "R-Y" and "B-Y", by the image signal processing circuit 21. Further, the control circuit 11 records ID codes, such as the date of recording, the track number, etc. together with the luminance signal Y and the differential color signals R-Y and B-Y, on the magnetic disk D according to a format of an electronic still video device, through the data signal processing circuit 24, in a conventionally known manner.

The processes of Steps 507 and 508 are carried out while the magnetic disk is rotated for one revolution. In Step 509, it is determined whether the D-A conversion for one image is completed. This can be determined by, for example, a detection of the PG signal (FIG. 9) outputted for one revolution of the magnetic disk. When the D-A conversion has not been completed, Step 508 is again executed. Thus, the recording of analog signals in the magnetic disk is continued. Conversely, when the D-A conversion has been completed, this routine ends.

As described above, a still picture reproducing device of the second embodiment has the frame memory 51, which can store the data of one image, and the D-A converters 52, 53 and 54. Therefore, according to this second embodiment, i t is possible to write the data on the magnetic disk D mounted in the disk device of the still image reproducing device, by using the OS of the personal computer 41.

Further, although each of the above embodiments includes a magnetic disk as the recording medium, the present invention is not restricted to this magnetic disk. Namely, the present invention can be adopted to other devices having a recording media other than the magnetic disk.

Still further, the present invention may be so embodied that digital data can be transferred between a personal computer and a peripheral device.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. HEI 2-184776 (filed on Jul. 12, 1990), which is expressly incorporated herein by reference in its entirety.

What is claimed is:

1. A device for reproducing a still image, stored in a recording medium in accordance with a predetermined data storage format, using a general purpose computer, said device comprising:

means for generating file control data in accordance with still image data stored in said recording medium and a predetermined data reading format used by an operating system of said general purpose computer, said still image data comprising an ID code for identifying said still image;

a file control data memory for storing said file control data of said still image recording medium in accordance with said predetermined data reading format;

means for transferring said file control data to said general purpose computer; and means for reading and transferring still image data recorded in said recording medium to said general purpose computer in accordance with said file control data, wherein said file control data transferring means and said still image data transferring means are operative in response to a command signal generated by said operating system of said general purpose computer, said still image data transferring means transfers said still image data to said general purpose computer in accordance with a logic block address scheme designated by said operating system of said general purpose computer, said logic block address scheme being stored in a memory device, said logic block address scheme comprising a plurality of addressable logic blocks that each have a predetermined number of bytes that correspond to a sampling rate per scanning line of said still image data, one logic block corresponding to one horizontal scanning line of still image data.

2. The device according to claim 1, further comprising a format memory for storing said predetermined data reading format.

3. The device according to claim 1, further comprising means for detecting whether said still image data is stored in said recording medium, wherein said generating means generates a file name, corresponding to a still image to be reproduced, in accordance with said still image data stored in said recording medium when said still image data is stored in said recording medium, said generating means automatically generating said file name when said still image data is not stored in said recording medium, said file name being included in said file control data.

4. The device according to claim 1, wherein said file control data transferring means transfers said file control data to said general purpose computer in accordance with a logic block address scheme designated by said operating system of said general purpose computer, said logic block address scheme being stored in a memory device.

5. The device according to claim 4, wherein said logic block address scheme designated by said operating system of said general purpose computer comprises a plurality of addressable logic blocks that each correspond to a horizontal scanning line of said still image data.

6. The device according to claim 1, further comprising means for rotating said recording medium at a constant rotational speed, said still image data transferring means transferring said still image data to said general purpose computer at a rate corresponding to said constant rotational speed.

7. The device according to claim 1, further comprising an image memory for storing said still image data recorded in said recording medium.

8. The device according to claim 7, wherein said image memory has a capacity for storing a predetermined number of scanning lines.

9. The device according to claim 7, wherein, said image memory comprises a frame memory for storing still image data corresponding to said still image.

10. The device according to claim 9, wherein said general purpose computer comprises means for outputting signals corresponding to the still image, said still image signals outputted by said general purpose computer being recorded in a recording medium by a recording device of an electronic still video device according to a data recording format of said electronic still video device.

11. A device for transferring data stored in a recording medium in accordance with a predetermined data storage format to a general purpose computer, said transferring device comprising:

means for reading image data stored in said recording medium;

a temporary memory for storing said image data read from said recording medium by said reading means;

a file control data memory for storing file control data of said recording medium, in accordance with a predetermined data reading format used by an operating system for controlling said general purpose computer;

means for transferring said file control data stored in said file control data memory to said general purpose computer; and means for transferring said image data stored in said temporary memory to said general purpose computer in accordance with said file control data, wherein said file control data transferring means and said image data transferring means are operative in response to a command signal generated by said operating system of said general purpose computer, said image data transferring means comprising means for transferring said image data to said general purpose computer in accordance with a logic block address scheme designated by said operating system of said general purpose computer, said logic block address scheme being stored in a memory device, said logic block address scheme comprising a plurality of addressable logic blocks that each have a predetermined number of bytes that correspond to a sampling rate per scanning line of said image data, one logic block corresponding to one horizontal scanning line of image data.

12. The device according to claim 11, wherein said image data stored in said recording medium comprises analog data, said analog data being A-D converted by an A-D converter before it is inputted to said temporary memory.

13. The device according to claim 11, further comprising format memory means for storing said predetermined data reading format and outputting said predetermined data reading format to be stored in said file control data memory.

14. The device according to claim 11, wherein the device comprises an image data transferring system for use between a still video device and said general purpose computer.

15. A device for reproducing a still image in a recording medium by using a general purpose computer, said device comprising:

means for converting file control data of said recording medium to a data reading format used by an operating system of the general purpose computer, said file control data including an ID code provided for identifying said still image;

a file control data memory for storing said file control data converted by said converting means;

means for transferring said file control data stored in said file control data memory to said general purpose computer; and means for transferring image data recorded in said recording medium to said general purpose computer in accordance with said file control data, said image data transferring means comprising means for transferring said image data to said general purpose computer in accordance with a logic block address scheme designated by said operating system of said general purpose computer, said logic block address scheme being stored in a memory device, said logic block address scheme comprising a plurality of addressable logic blocks that each have a predetermined number of bytes that correspond to a sampling rate per scanning line of said still image, one logic block corresponding to one horizontal scanning line of image data.

* * * * *